(12) United States Patent
Jensen et al.

(10) Patent No.: US 9,500,383 B2
(45) Date of Patent: Nov. 22, 2016

(54) METHOD FOR CONTROLLING A VENTILATION SYSTEM FOR THE VENTILATION OF AN ENCLOSURE AND A VENTILATION SYSTEM

(71) Applicants: John Borsting Jensen, Struer (DK); Morten Lundehoj, Odense C (DK)

(72) Inventors: John Borsting Jensen, Struer (DK); Morten Lundehoj, Odense C (DK)

(73) Assignee: InVentilate Holding ApS (DK)

( * ) Notice: Subject to any disclaimer, the term of this patent is extended or adjusted under 35 U.S.C. 154(b) by 499 days.

(21) Appl. No.: 13/776,119

(22) Filed: Feb. 25, 2013

(65) Prior Publication Data

US 2013/0171922 A1    Jul. 4, 2013

Related U.S. Application Data

(63) Continuation of application No. PCT/DK2011/050316, filed on Aug. 22, 2011.

(30) Foreign Application Priority Data

Aug. 23, 2010   (DK) .................................. 2010 00738

(51) Int. Cl.
  *F24F 11/00*   (2006.01)
  *F24F 11/04*   (2006.01)
  *F24F 7/00*    (2006.01)

(52) U.S. Cl.
  CPC ........ *F24F 11/0001* (2013.01); *F24F 11/0079* (2013.01); *F24F 11/043* (2013.01);
  (Continued)

(58) Field of Classification Search
  CPC ............................. F24F 11/0001; F24F 11/043
  (Continued)

(56) References Cited

U.S. PATENT DOCUMENTS 5,099,751 A * 3/1992 Newman .................. A62B 3/00
                                                              454/187
5,257,736 A * 11/1993 Roy .......................... F24F 7/08
                                                              165/232

(Continued)

FOREIGN PATENT DOCUMENTS

AU       717196 B2    1/1998
BE     1017474 A7   10/2008
(Continued)

OTHER PUBLICATIONS

International Search Report Application No. PCT/DK2011/050316 Completed: Oct. 31, 2011; Mailing Date: Nov. 10, 2011 3 pages.

*Primary Examiner* — Steven B McAllister
*Assistant Examiner* — Jonathan Cotov
(74) *Attorney, Agent, or Firm* — St. Onge Steward Johnson & Reens LLC

(57) ABSTRACT

A method for controlling a ventilation system for the ventilation of an enclosure. The ventilation system includes two or more ventilation units, which each selectively and repeatedly can be controlled to establish an air flow to and/or from the enclosure. The method includes the steps of: determining information regarding operational conditions of one or more of the two or more ventilation units by measuring the air flow through or the pressure differential across the ventilation units, generating operation control data for one or more of the ventilation units from information regarding operational conditions determined for at least one other of the ventilation units, and controlling the operation of one or more of the two or more ventilation units by applying the generated operation control data. The invention further relates to a ventilation system for ventilating an enclosure.

18 Claims, 4 Drawing Sheets

(52) U.S. Cl.
CPC ...... *F24F 11/0009* (2013.01); *F24F 2007/004* (2013.01); *F24F 2011/0002* (2013.01); *F24F 2011/0006* (2013.01); *F24F 2011/0038* (2013.01); *F24F 2011/0041* (2013.01); *F24F 2011/0058* (2013.01); *Y02B 30/746* (2013.01)

(58) Field of Classification Search
USPC ........................................................ 454/239
See application file for complete search history.

(56) References Cited

U.S. PATENT DOCUMENTS

| | | | | |
|---|---|---|---|---|
| 5,282,770 | A | * | 2/1994 | Shibata ................... F24F 7/08 454/239 |
| 5,538,471 | A | | 7/1996 | Guiles, Jr. |
| 5,545,086 | A | | 8/1996 | Sharp et al. |
| 5,705,734 | A | | 1/1998 | Ahmed |
| 6,699,120 | B1 | * | 3/2004 | Darum ................. F24F 11/0001 454/239 |
| 7,766,734 | B2 | * | 8/2010 | Dietz .................... F24F 11/0001 137/630 |
| 2006/0172687 | A1 | * | 8/2006 | Vroege ..................... F24F 7/08 454/239 |
| 2008/0039006 | A1 | * | 2/2008 | Vroege ..................... F24F 7/08 454/239 |
| 2008/0108295 | A1 | * | 5/2008 | Fischer ................. F24F 3/1423 454/239 |
| 2008/0188173 | A1 | * | 8/2008 | Chen .................... F04D 27/004 454/239 |
| 2010/0226792 | A1 | | 9/2010 | Sato et al. |
| 2010/0286831 | A1 | * | 11/2010 | Boudreau ............ F24F 12/006 700/278 |

FOREIGN PATENT DOCUMENTS

| | | |
|---|---|---|
| CA | 2198053 C | 5/2000 |
| CN | 1113195 C | 7/2003 |
| CN | 101675250 A | 3/2010 |
| DE | 19855056 A1 | 5/2000 |
| DE | 20214833 U1 | 11/2003 |
| EP | 1403592 A2 | 3/2004 |
| EP | 2163768 A1 | 3/2010 |
| JP | 2008291656 A | 12/2008 |
| WO | 9514890 A1 | 6/1995 |
| WO | WO9514890 * | 6/1995 |
| WO | 9606314 A1 | 2/1996 |
| WO | 2004068038 A1 | 8/2004 |
| WO | 2008102227 A2 | 8/2008 |

* cited by examiner

METHOD FOR CONTROLLING A VENTILATION SYSTEM FOR THE VENTILATION OF AN ENCLOSURE AND A VENTILATION SYSTEM

FIELD OF THE INVENTION

The invention relates to a method for controlling a ventilation system for the ventilation of an enclosure, wherein the system comprises two or more ventilation units which each selectively can establish an air flow to or from the enclosure.

The invention further relates to a ventilation system for ventilating an enclosure.

BACKGROUND OF THE INVENTION

Ventilation systems comprising more than one ventilation units are well known in the art. However when several ventilation units are operating in relation to the same enclosure the risk of ventilating too much or too little is increased in that controlling the overall effect of all the ventilation units simultaneously becomes very difficult.

From the International patent application WO 95/14890A1 it is therefore known to synchronise the operation of a pair of ventilation units so that a unit interchangeably blows air into a room at one side of a house while the other unit suck air out of the room at the opposite side of the house and visa versa to achieve air exchange equilibrium.

However, if a window in the room is opened, if one of the units is more efficient than the other or if one of the units are more wind loaded than the other, equilibrium is very difficult to establish and the overall efficiency of the ventilation system is reduced.

From the German patent application DE 198 55 056 A1 it is known to control the operation of ventilation units placed in separate rooms by means of signals from a room mounted air quality sensor unit and a portable control unit. However, again the overall efficiency of the ventilation system is reduced if one of the units is more efficient than the other or if one of the units are more wind loaded than the other units and it is difficult to control the overall ventilation if e.g. doors between the rooms are opened so that all the units in practise ventilates the same enclosure.

An object of the invention is therefore to provide for advantageous technique for controlling the operation of a ventilation system comprising two or more ventilation units capable of enabling an air flow to or from the same enclosure.

SUMMARY OF THE INVENTION

The invention provides for a method for controlling a ventilation system for the ventilation of an enclosure. The ventilation system comprises two or more ventilation units, which each selectively and repeatedly can be controlled to establish an air flow to and/or from the enclosure. The method comprises the steps of:

- determining information regarding operational conditions of one or more of the two or more ventilation units by at least measuring the air flow through the ventilation units or the pressure differential across said ventilation units,
- generating operation control data for one or more of the ventilation units from information regarding operational conditions determined for at least one other of the two or more ventilation units, and
- controlling the operation of one or more of the two or more ventilation units by applying the generated operation control data.

In an embodiment of the invention, said information regarding operational conditions of one or more of said two or more ventilation units are determined by at least measuring the air flow through said ventilation units.

In an embodiment of the invention, said information regarding operational conditions of one or more of said two or more ventilation units are determined by at least measuring the pressure differential across said ventilation units.

By knowing the flow through other ventilation units, the ventilations units can be individually controlled to give a better total system performance in asymmetrical working conditions. As an example the wind on one of the walls of the enclosure would increase the incoming flow in ventilation units mounted in this particular wall. The total ventilation level in the enclosure will then be influenced by the external wind. When knowing the flow through the individual ventilation unit, another unit can compensate for this by increasing or reducing its own flow.

By knowing the pressure differential across the ventilation units, whether they are completely open, partly open or closed, the amount of passive ventilation, which can be obtained by opening one or more of the ventilation units more or less than in the present situation, can be calculated. Furthermore, the flow generated by a ventilation unit depends on the pressure differential across the ventilation unit, which means that the flow can be estimated from the pressure differential and knowledge of the working curves of the ventilation unit.

Another example of asymmetrical working conditions could be thermal differences inside and outside the enclosure where elevation differences will cause pressure differences because of changed air density or if a passive opening in the enclosure—such as a window or a stove—would cause leak flow through this opening. The pressure differential could arise from ventilating devises not included in the ventilation system control e.g. a cooking hood or a central free cooling ventilator.

The interchanged knowledge about flow through individual ventilation units can also be used to minimize the power consumption for forced ventilation by reducing the forced ventilation and let the natural or external flow forces assist or overtake the flow generation. This is possible when the actual size and direction of the flow in the ventilation units are known and the ventilation paths through the enclosure can be adapted to the assisting flow forces.

It should be emphasised that by the term "ventilation unit" is to be understood any kind of component or device capable of actively generating an air flow by means of an air flow generator, such as a waving or rotating fan.

It should also be emphasised that by the term "enclosure" is to be understood any kind of room, container or enclosed space to and from which an air flow can be established. The term "enclosure" does not exclude that the enclosure can be subdivided into smaller rooms as long at there is a substantially free air passage between the rooms in the enclosure e.g. in the form of open doors, windows, air passage orifices in or at the doors, windows or walls of the partition between the rooms of the enclosure. Thus, the term "enclosure" does cover an entire house, an entire building or parts of a house or a building as long as a substantially free air passage is established between the rooms in the house or building.

The operation condition "flow" is any type of information which can be directly or indirectly used as a measure for the air flow through the ventilation unit. It can be direct information about the air flow volume or air flow mass or it can be lower level data e.g. pressure differential across a restriction, static versus dynamic pressure, cooling level of a heated element, ventilator loading, Vortex patterns, Coriolis effect, rotating anemometer speed, acoustic echoes, heat capacity ratios, temperature change rates or other known air flow measurement method.

Flow information interchanging is also present in a ventilations unit with a preset flow rate, if the ventilation unit transmits information regarding the success of maintaining a ventilation level to another ventilation device or a control unit controlling another ventilation unit. Flow information is also data from more than one ventilation unit if correlations of this information give knowledge of the ratios of flow though the individual ventilation units even without knowing the absolute level of flow.

In an aspect of the invention, the measuring of the air flow through the ventilation units is performed either by directly measuring the air flow volume or air flow mass or indirectly by measuring e.g. pressure differential across a restriction, static versus dynamic pressure, cooling level of a heated element, ventilator loading, Vortex patterns, Coriolis effect, rotating anemometer speed, acoustic echoes, heat capacity ratios, temperature change rates or other known air flow indicators.

In an aspect of the invention, the step of generating said operation control data for each of the ventilation units is depending on said determined information regarding operational conditions for that particular ventilation unit.

Preferable the operational condition for the controlled ventilation unit is part of the basis for generating control data. This gives better control of the total ventilation of the enclosure.

In an aspect of the invention, said air flow through said ventilation units is measured by means of a direct or indirect measure of air flow volume, air flow mass, cooling of a heated element, pressure differential or ventilator load.

In an aspect of the invention, said operation control data is further generated on the basis of a current ventilation need of said enclosure defined in relation to a predefined level of one or more characteristics of said enclosure.

Using information about the current ventilation need of the enclosure is advantageous in that it enables the ventilation system to be controlled more precisely according to the actual needs thus, the ventilation level can be reduced or increased when necessary. This reduces the total energy consumption of the system and/or improves the ventilation quality of ventilation system.

In an aspect of the invention, said characteristics of said enclosure is selected from the group consisting of: humidity, temperature, motion, time, light, infra-red light, $CO_2$, $O_2$, weather forecast, subjective operator setting, status of openings in enclosure and the operational status of auxiliary ventilation devices, cooling sources or heating sources.

The information about one or more of the mentioned characteristics reduces the energy consumption and/or improves the ventilation quality.

In an aspect of the invention, the operation of said two or more ventilation units is synchronised so that at least one first ventilation unit of said two or more ventilation units actively establishes an air flow to or from said enclosure while at least one second ventilation unit of said two or more ventilation units enables an air flow to or from said enclosure in an opposite direction in relation to the direction of said air flow through said first ventilation unit.

Synchronising the operation of the two or more ventilation units is advantageous in that it enables a more constant air pressure inside the enclosure and it improves the efficiency of the ventilation system. The synchronising can basically be performed in two ways: In a first embodiment a first ventilation unit is actively moving air in or out of the enclosure while a second ventilation unit is actively moving air in the opposite direction. In a second embodiment a first ventilation unit is actively moving air in or out of the enclosure while a second ventilation unit passively allows air to be drawn or pushed through the ventilation unit in the opposite direction. In both cases information about the air flow through the ventilation units is somehow exchanged so that general operation of the ventilation system can be optimised.

In an aspect of the invention, the operation of a first ventilation unit and a second ventilation unit of said two or more ventilation units is synchronised to control the pressure inside said enclosure in accordance with a predefined pressure level.

The energy consumption can be optimized by controlling the levels of the forced or natural ventilation flows to and from the enclosure. The total flow in both directions will be the same but the pressure differential could be controlled and thereby the energy required to establish the flow can be shared otherwise between the incoming flow and the outgoing flow driving forces.

The internal pressure level could also be controlled with the purpose to control the leak flow through other openings in the enclosure than ventilation units. As an example the pressure inside the enclosure could be controlled to a level below the pressure outside the enclosure to avoid moisture build-ups around leaking spots when it is cold outside the building. Another purpose of controlling the differential pressure is to deliberately use a passive opening in an enclosure as a controlled ventilation opening, e.g. as a base level ventilation in a bathroom.

The predefined pressure level could be an absolute pressure level or the predefined pressure level, in relation to which the ventilation system attempts to control the pressure in the enclosure, could also be defined as a given pressure difference between the inside and the outside of the enclosure, i.e. the inside pressure level is controlled relatively to the pressure outside said enclosure with a predefined offset.

The predefined pressure level could be static or it could vary dynamically in relation to time of day, time of year, the operational status of other ventilation systems or in relation to a number of other factors.

In an embodiment of the invention the ventilation units is synchronised to control the pressure inside said enclosure so that the inside pressure is maintained 0.1 to 5 Pascal below the pressure outside said enclosure.

In an aspect of the invention, at least one of said two or more ventilation units communicate said information regarding operational conditions and/or said operation control data wirelessly.

Ensuring that communication to and/or from the ventilation units can happen wirelessly is advantageous, in that it reduces the cost and time else necessary to establish wirings for the condition or control signals to and from the ventilation units. It could otherwise be difficult to install a wired communication system reaching all ventilation units in an enclosure, e.g. if the enclosure is an old house.

In an aspect of the invention, said operation control data is communicated to said two or more ventilation units as overlaying signals on a power supply wire supplying power to an air flow generator of said two or more ventilation units.

If the air flow generator of the two or more ventilation units are powered by the utility grid, the cost and time else necessary to establish wirings for the condition or control signals between the ventilation units could be severely reduced by performing the communication to and from the ventilation units as overlaying signals on the power supply wire.

In an aspect of the invention, said air flow is measured by measuring an inside temperature at an inside of said enclosure at said ventilation units and measuring an outside temperature at an outside of said enclosure at said ventilation units.

Calculating the size of the air flow on the basis of a measurement of the temperature difference over ventilation unit is advantageous in that it provides for a very inexpensive method of establishing the size of the air flow particularly when the ventilation unit comprises a heat regenerator or recuperator.

The flow is then calculated on basis of knowledge of the heat capacity of air, regenerator material, heat exchanging surface and/or the ratio of incoming and outgoing air.

If the ventilation unit is provided with a regenerator the temperature profiles in both ventilation directions provides particularly reliable information about the flow through the regenerator. It also gives information about dust build-ups in regenerator or filters or information about air moisture. The data from flows in both direction and knowledge of fan operation characteristics gives additional information about unintended flow restriction in filters or regenerator openings.

The invention further relates to a ventilation system for ventilating an enclosure. The ventilation system comprises two or more ventilation units and one or more controllers for controlling the ventilation units, wherein the controllers are adapted for performing a method according to any of the preceding methods.

A ventilation system in which the individual ventilation units are controlled on the basis of operation control data which are generated on the basis of information regarding operational conditions of other ventilation units is advantageous in that the performance of the ventilation system is hereby improved as the overall energy consumption of the system can be reduced and/or the efficiency of the ventilation system is increased.

In an aspect of the invention, one or more of said two or more ventilation units comprise one or more air valves for changing the resistance of air flow through said ventilation units.

Providing the ventilation units with an air valve is advantageous in that it allows the ventilation unit to better control the air flow through the ventilation unit, especially when forces external to the ventilation unit drives air through the unit. The air valve could be variable controlled e.g. by means of a damper or a slide and thereby control the flow to any level between free flow and no flow.

It should be emphasised that by the term "air valve" is to be understood any kind of air strangler, throttle, register, gate, slide, damper or any other device suitable for changing the resistance of the air flow through the ventilation units.

In an aspect of the invention, said one or more of said two or more ventilation units comprise heat transferring means for transferring heat energy from air flowing out of the enclosure through said ventilation units to air flowing into the enclosure through said ventilation units or transferring heat energy from air flowing into the enclosure through said ventilation units to air flowing out of the enclosure through said ventilation units.

Providing the ventilation units with heat transferring means is advantageous in that it allows for energy conservation by transferring energy from outgoing to incoming air or visa versa. This will reduce cost and save energy e.g. for heating the enclosure inside during cold periods or cooling an enclosure during warm periods.

It should be emphasised that by the term "heat transferring means" is to be understood any kind of regenerator or recuperator in form of a counter-flow or cross-flow heat exchanger, it could be in the a heat transfer system which would move energy in between the ventilation units by means of water or another coolant or it could be any other heat transferring device or arrangement suitable for transferring heat between different air flows.

In an aspect of the invention, said heat transferring means is a regenerator.

A regenerator is very effective as a temporary heat storage element and a regenerator is relatively inexpensive and simple to produce. Furthermore a regenerator is relatively small and therefore requires a smaller opening in the enclosure structure.

The ratio of heat exchange can be controlled for any ventilation unit by controlling the quantity of incoming flow in each ventilation cycle. The quantity can be controlled by changing the duration of the cycle time and/or by changing the air flow rate through the ventilation unit. The air flow ratio could also be shaped to any pattern within the regenerator ventilation cycle.

In an aspect of the invention, at least one of said two or more ventilation units comprises a receiver for receiving operation control data from said one or more controllers and/or a transmitter for transmitting information regarding the operational conditions of said at least one ventilation unit to said one or more controllers.

A transmitter will enable the unit to send information regarding operational conditions to the controller generating said operation control data. A transmitter is also necessary for transmitting the operation control data from the controlling device.

The receiver will enable to unit receive the operation control data from the controlling device. A receiver is also necessary to receive information regarding operational conditions from other ventilation units to generate operation control data.

In an aspect of the invention, said one or more controllers for generating the said operation control data are integrated in at least one of said two or more ventilation units.

Integrating the controller in at least one of the ventilation units is advantageous in that the number of components of the ventilation system will thereby be reduced, hereby reducing manufacturing cost and cost of installation. If each ventilation unit comprises their own controller i.e. each unit comprises the controller controlling that specific unit only information regarding air flow through the specific ventilation unit would have to be communicated to other ventilation unit. This is also advantageous in that each ventilation unit will not have to receive operation control data from an external controller and the overall data logistic of the ventilation system is thereby simplified.

Different sensors for basis measuring characteristics of said enclosure could also be mounted inside the ventilation unit thereby reducing the installation cost of the whole ventilations system.

BRIEF DESCRIPTION OF THE DRAWINGS

The invention will be described in the following with reference to the figures in which.

DETAILED DESCRIPTION OF THE INVENTION

Figure 1:
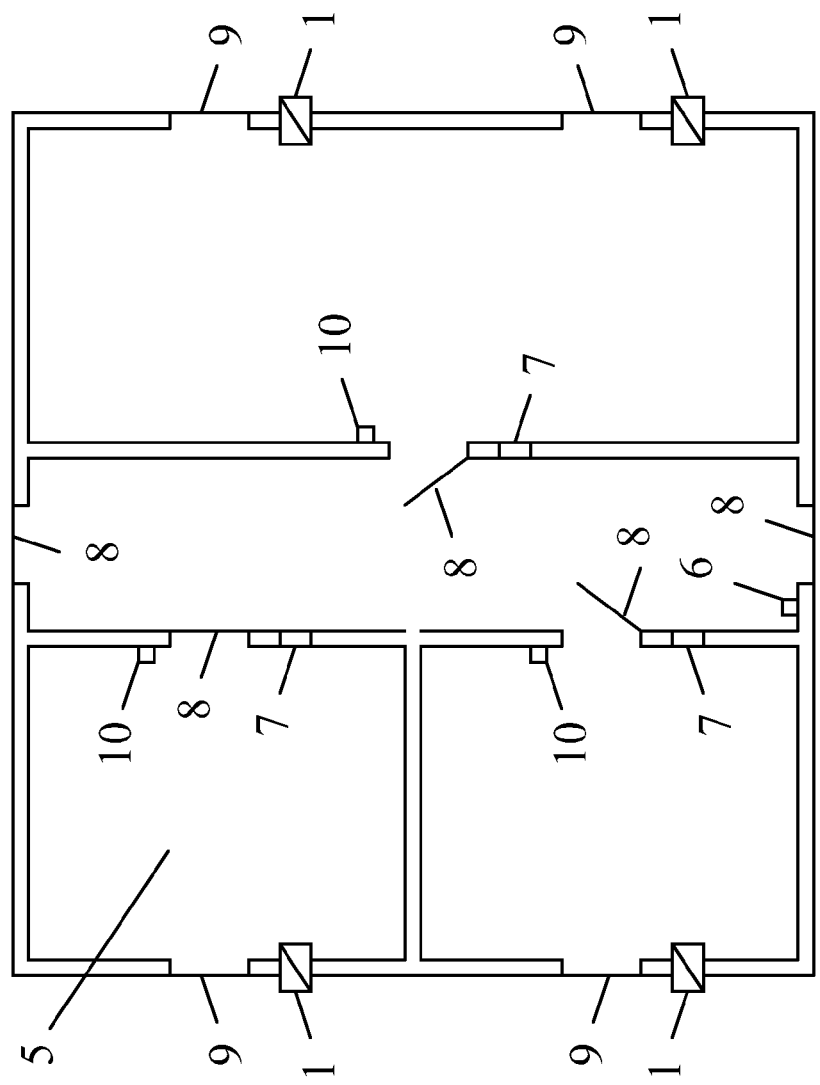
FIG. 1 illustrates an enclosure comprising four ventilation units.

FIG. 1 illustrates a ventilations system comprising four ventilation units 1. Air can flow through each of the ventilation units 1 in one or two directions. The ventilation units 1 are situated in the perimeter of the enclosure 5.

In this embodiment of the invention the enclosure 5 is shown as a building or section of a building comprising four rooms in which a single ventilation unit 1 is placed in two of the rooms and two other ventilation units 1 are placed in third room. However, it is obvious to the skilled person that the number and distribution of rooms inside the enclosure 5 can be varied in a multitude of way as well as the number and distribution of the ventilation units 1 can be varied in a multitude of ways.

In this embodiment the rooms form a single enclosure 5 because the air can flow from one room to another via the air passage openings 7 or through the doors 8 if they are opened. The rooms have windows 9 which can be opened manually or automatically.

In this embodiment of the invention the ventilation system comprises a controller 6 placed centrally in a single room and a number of the local set point units 10 placed in a number of other rooms. The local set point units 10 allows user setting of the local ventilation need and/or instruments for automatically sensing the required ventilation level and method. In this embodiment of the invention the information regarding air flow through the individual ventilation units 1 are transmitted to the central controller 6. The central control unit 6 will then generate operation control data to be transmitted to a specific ventilation unit 1 on the basis of information about the air flow through at least on of the other ventilation units 1 in the ventilation system so that the central controller 6 is able to control the operation of all the ventilation units 1 in the ventilation system 1 based on information about the air flow through other ventilation units 1 in the ventilation system.

In another embodiment of the invention the controller 6 could be integrated in one of the ventilation units 1 or it could be integrated in one or more of the local set point units 10.

In another embodiment of the invention the set point units 10 could be integrated in one or more of the ventilation units 1 to be adjusted manually or the set point of the ventilation system with regards to efficiency, temperature, oxygen level, $CO_2$ level or other could be communicated to the ventilation system controller 6 no matter if the controller was integrated in the ventilation units 1 or not.

In another embodiment of the invention all the ventilation units 1 in the ventilation system could be provided with their own integrated controller 6 so that the operation of each ventilation unit 1 was controlled by their own integrated controller 6. Only information regarding the air flow through the individual ventilation units would thereby have to be interchanged between the ventilation units 1.

In an advantageous embodiment of the invention it would be ensured that the individual ventilation units 1 would know from which ventilation unit 1 specific air flow data is obtained to ensure an even better overall efficiency of the ventilation system.

In this embodiment of the invention the data communication between the controller 6, the local set point units 10 and the ventilation units 1 is conducted by means of dedicated wires between the units 1, 6, 10 e.g. in the form of a dedicated field bus communication system. However, in another embodiment some or all of the units 1, 6, 10 in the ventilation system could communicate wirelessly or as overlaying signal on the utility grid system in the enclosure 5.

The internal flow paths in the enclosure 5 depend on the ventilation task and the external forces. If a wind is blowing against one of the enclosure 5 walls on which ventilation units 1 are provided, then there will be natural flow of air from ventilation units 1 placed in this wall towards the ventilation unit 1 placed in the opposite wall. This natural air flow can be utilized when controlling the overall ventilation task. Of course care should be taken in respect to draft or heat loss.

In this embodiment of the invention it is possible to change the force of the air flow generator inside each ventilation unit 1, so the flow paths at any time corresponds to the requested flow independent of the external forces. The forces could also come from thermal differences inside an outside the enclosure 5.

The requested flow paths could also be disturbed if a window 9 in the enclosure perimeter is opened and a pressure differential across the window 9 creates an air flow. By knowing the flow through the ventilation units 1, the leak flow can be detected and an appropriate action could be started by adjusting the air flow through some or all ventilations units 1 or changing the pressure inside the enclosure 5. Similar method could be used to adapt to other active ventilation openings e.g. cooker hoods or free cooling ventilators.

In an embodiment of the invention substantially all possible combinations of air flow patterns inside the enclosure 5 between all ventilation units 1 could be known to the system controller or controllers. Either as a pre-programmed information or as knowledge gained during use of the system by correlating the flow through each of the ventilation units 1 over longer time. It could also be pre-programmed by an automatically calibration process, where some or all flow path combinations are tested and measured. Knowledge of the possible flow patterns helps optimizing the power consumption and ventilation efficiency of the system.

In an embodiment of the invention, the flow patterns and levels could change with the seasons and within individual days, such that at any point in time the current air flow reflects internal conditions and the external environment. The ventilation method depend on building design, internal loads, natural driving forces, outdoor conditions and season and fulfil the immediate demands to the indoor environment in the most energy-efficient manner.

By controlling the operation of each ventilating unit 1 based on knowledge about the air flow through other ventilating units 1 it is possible to implement control strategies which can maximise the use of ambient energy with an effective balance between the use of automatic control and the opportunity for users of the building to exercise direct control of their environment. When a user makes a local change in demand and thereby local ventilation level, then other ventilation units 1 will adapt and compensate the ventilations levels elsewhere.

An example could be that a user close to a specific ventilation unit 1 feels hot and therefore actively controls the specific ventilation unit 1 to constantly and actively blow in the outside air to hopefully cool the user. In this case other ventilation units 1 in the enclosure 5 could continue their normal operation but because they have knowledge of the constant in-flow of air from the specific ventilation unit 1 the operation of the other units 1 can be adjusted accordingly.

In another embodiment the operation of one or more specific ventilation units 1 could be actively controlled by a user so that the operation of these units 1 is very different from the operation of the other units 1. This could e.g. be done to avoid an unwanted local draught, to try to raise or lower the temperature locally slightly or other. However, because the ventilation units 1 are operated on the basis of interchanged information on the air flow through the units 1, the other units will be able to adapt their operation to the "asymmetric" circumstances to optimise the overall operation of the ventilation system.

In the same manner it is possible for a ventilation system according to the present invention which comprises a plurality of ventilation units 1 to compensate any defects or reduced function in one or more ventilation unit 1 by redistributing the ventilations task to other ventilation units 1.

The control strategies can establish the desired air flow rates and air flow patterns at the lowest energy consumption possible or with emphasis on other aspects as economy, draft, noise level or individual wishes. There could be balances or compromises in comfort versus energy consumption or in electrical energy versus heat energy.

As an example a larger building with rooms on the north and on the south side could use this as an active strategy on a sunny day. The rooms toward South would need cooling and the rooms towards North need heating. When enabling an air flow from the South rooms to North rooms, the North room will receive heat energy from the South room. The South rooms will be naturally cooled by the larger flow of outside air.

Same type of strategy could be used in a larger office building with night cooling function. Then segments of the building not used for offices could be cooled significant during the night. During the following day controlled air flows can be led partly through these segments towards the offices and thereby maintaining the optimum temperature inside the offices.

In a similar way heated air can be led through segments of a building during the day and then regain the heat by other airflows during the night.

Figure 2:
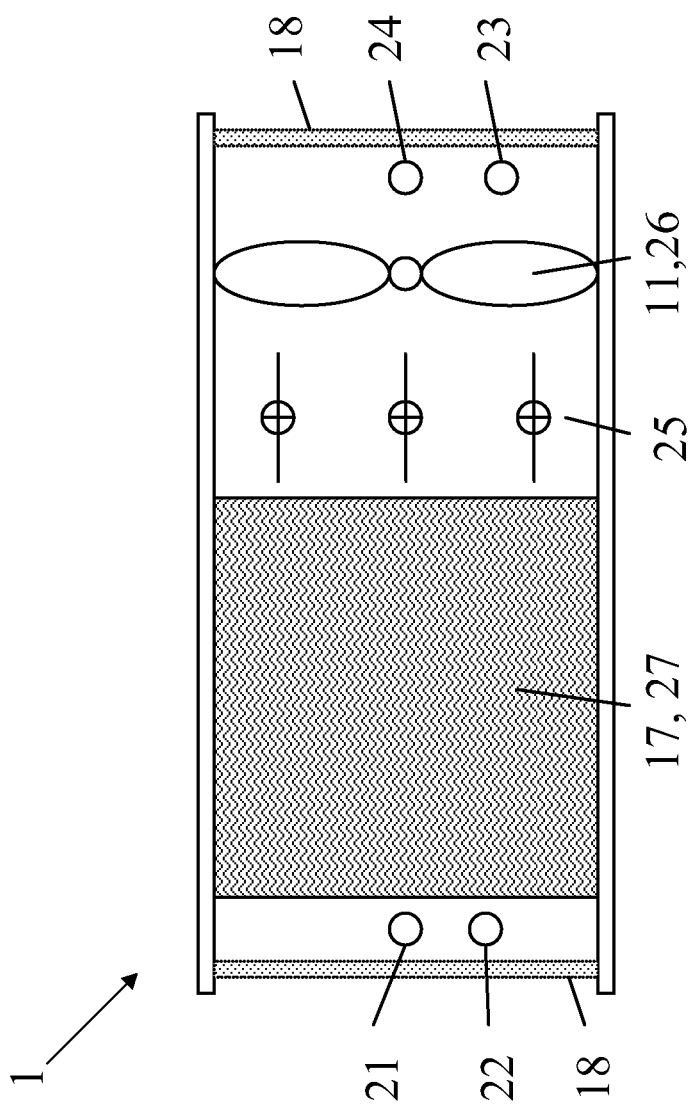
FIG. 2 illustrates an example of a ventilation unit comprising a regenarator.

FIG. 2 illustrates an example of a ventilation unit 1.

In this embodiment the ventilation unit 1 comprises a outside temperature sensor 22 which measures the outside air flow temperature at an outside side of the ventilation unit 1 and an inside temperature sensor 23 which measures the inside air flow temperature at an inside side of the ventilation unit 1. When the ventilation unit 1 is provided with heat transferring means 17 and when the heat transferring properties of the heat transferring means 17 are known, the size of the air flow can be deduced relatively simply and with a relatively high accuracy.

However, in this embodiment of the invention the ventilation unit 1 is provided with a dedicated flow sensor 21 in the form of a hot wire but in another embodiment the size of the air flow through the ventilation unit 1 can be determined according to volume or mass by means of numerous means and methods including but not limited to static-dynamic pressure difference, pitot tube, vortex generation, impeller anemometer, pressure difference over air resistor, ventilator load and/or temperature differences/profiles.

In this embodiment of the invention the ventilation unit 1 is also provided with an air quality sensor 24 which measures one or more properties of the air e.g. the level of carbon dioxide, oxygen, humidity, dew point temperature, particles, organic gasses, smells or pollution. Providing the ventilation units 1 with such sensors 24 is advantageous in that it hereby is possible also to control the operation of the ventilation units 1 in accordance with one or more predefined or current air quality properties of the air inside the enclosure 5 and/or outside the enclosure 5.

In this embodiment of the invention the ventilation unit 1 comprises an air flow generator 11 in form of a ventilator 26.

In this embodiment of the invention the ventilation unit 1 comprises a number of air valves 25 by which the air resistance through the ventilation unit 1 can be controlled.

In this embodiment of the invention the ventilation unit 1 is provided with heat transferring means 17 in the form of a regenerator 27, which makes it possible to transfer heat energy from the outgoing to incoming air flow or opposite and thereby reduce loss or gain of heat energy inside a the enclosure 5.

In this embodiment of the invention the ventilation unit 1 is provided with filters 18 reduce dirt deposits on the internal components of the ventilation unit 1 and to improve inside air quality.

The example of a ventilation unit 1 disclosed in FIG. 2 is made as design with regenerator 27 for retaining heat energy. The heat energy conservation is made as the direction of the flow trough the regenerator 27 alternates and the air heat energy from one direction is transferred to air flow in the following direction. The design of such a ventilation unit 1 could vary in many ways, and the invention is not limited to this solution.

Other designs of micro ventilation units with heat exchanger or other heat conservation methods give similar benefits and might be used instead. Some applications could work even without a heat energy transfer function.

Figure 3:
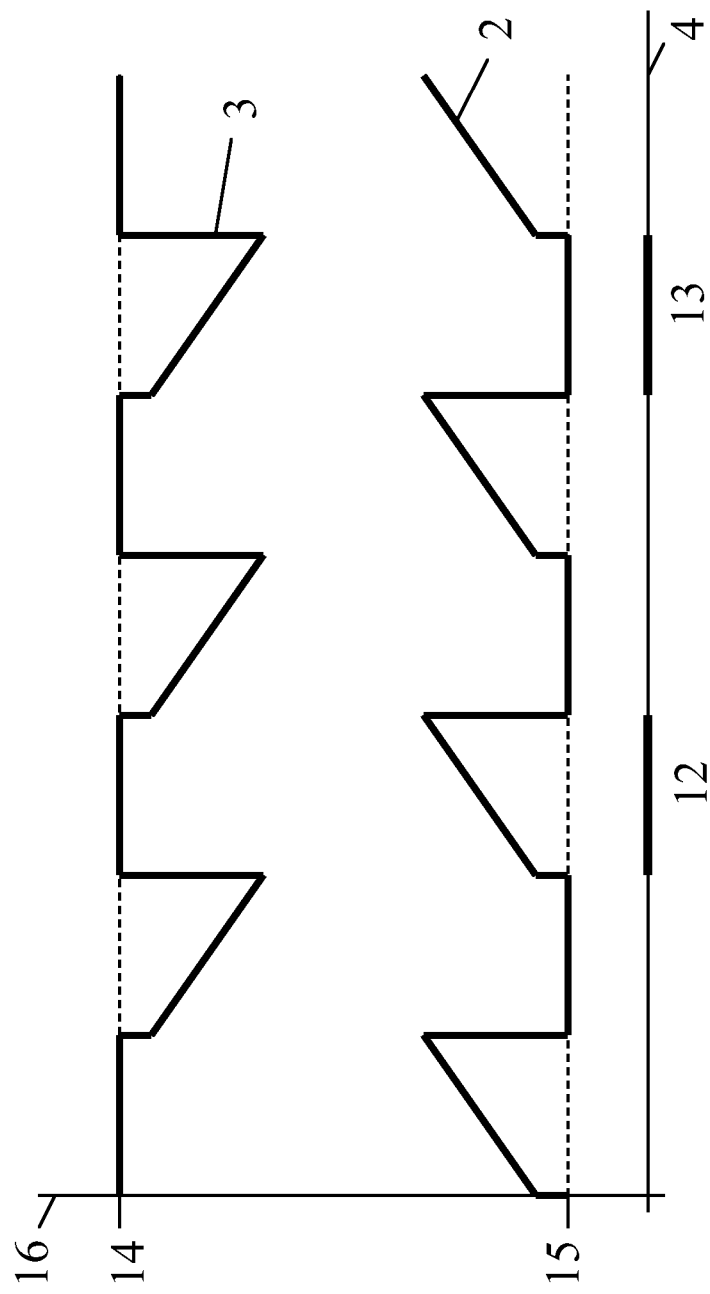
FIG. 3 illustrates a temperature sensor graphs of a ventilation unit with regenerator.
Figure 4:
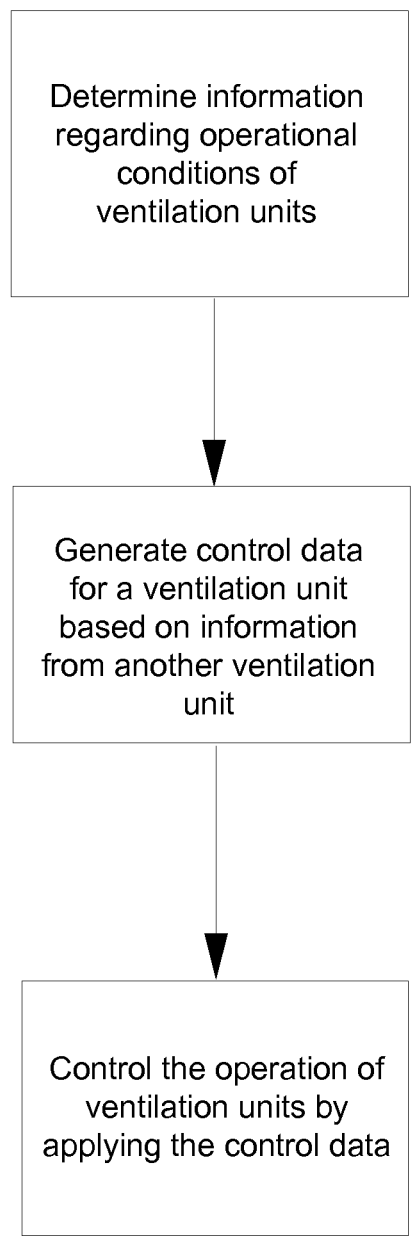
FIG. 4 illustrates a method for controlling a ventilation system according to the present invention.

FIG. 3 illustrates temperature sensor graphs of a ventilation unit 1 with a regenerator 27 and outside and inside temperature sensors 22, 23 as illustrated in FIG. 2. The graph temperature axis 16 is the y axis. On this axis the outside temperature 14 measured by the outside temperature sensor 22 and the inside temperature 15 inside temperature sensor 23 are illustrated as dotted lines. The graph time axis 4 is the x axis. On this two periods are shown: outgoing air period 12 and incoming air period 13.

The inside temperature sensor value 3 is shown in a graph, which could be the value of the inside temperature sensor 23 of FIG. 2. In the same way the outside temperature sensor value 2 is shown a graph, which could be the value of the outside temperature sensor 22.

During the outgoing air period 12, heat energy is transferred from the air to the regenerator 27. The rise in temperature is caused by two properties. The sudden rise is related to the heat transfer capability of the regenerator 27. This relates to the parameters mass flow, air heat capacity, regenerator surface and the condition of the surface. The slope if rising temperature is a rate depending on the parameters mass flow, air heat capacity, regenerator mass and regenerator heat capacity.

The incoming air period 13 shows same behaviour but with a fall in inside temperature sensor value 3 instead. The properties causing the fall are the same as in outgoing air period 12.

By comparing the temperature profiles of outgoing air period 12 and incoming air period 13 it is possible to calculate the ratio between incoming air mass flow and outgoing air mass flow, when no condensation is present. By knowing the properties of the regenerator 27 it is also possible to calculate the absolute flow values through the regenerator by means of the temperature change rate. The sudden jump in temperature can be used as an indication of the flow rate and the properties of the surface of the regenerator 27.

When using a heat exchanger instead of a regenerator there will be simultaneous flow in both directions though the ventilation unit. A similar approach can be used here when measuring the incoming and outgoing flow temperatures on both sides of the heat exchanger. Then a relative flow ratio can be calculated and the total flow can be estimated from the flow/surface dependent ratio of reduced heat conservation.

The invention has been exemplified above with reference to specific examples of enclosures 5, ventilations systems, ventilation units 1, control characteristics and other. However, it should be understood that the invention is not limited to the particular examples described above but may be designed and altered in a multitude of varieties within the scope of the invention as specified in the claims.

What is claimed is:

1. A method for controlling a ventilation system for the ventilation of an enclosure, the system comprising two or more ventilation units which each selectively and repeatedly can be controlled to establish an air flow to and from the enclosure, said method comprising the steps of:
   determining information regarding operational conditions of one or more of said two or more ventilation units by at least measuring the air flow through said ventilation units or the pressure differential across said ventilation units,
   generating operation control data for one or more of the ventilation units, using information regarding operational conditions determined at at least one other of said two or more ventilation units, and
   controlling the operation of one or more of said two or more ventilation units by applying said generated operation control data.

2. The method according to claim 1, wherein said information regarding operational conditions of one or more of said two or more ventilation units are determined by at least measuring the air flow through said ventilation units.

3. The method according to claim 1, wherein said information regarding operational conditions of one or more of said two or more ventilation units are determined by at least measuring the pressure differential across said ventilation units.

4. The method according to claim 1, wherein said measuring of the air flow through the ventilation units is performed either by directly measuring the air flow volume or air flow mass or indirectly by measuring e.g. pressure differential across a restriction, static versus dynamic pressure, cooling level of a heated element, ventilator loading, Vortex patterns, Coriolis effect, rotating anemometer speed, acoustic echoes, heat capacity ratios, temperature change rates or other known air flow indicators.

5. The method according to claim 1, wherein the step of generating said operation control data for each of the ventilation units is depending on said determined information regarding operational conditions for that particular ventilation unit.

6. The method according to claim 1, wherein said operation control data is further generated on the basis of a current ventilation need of said enclosure defined in relation to a predefined level of one or more characteristics of said enclosure.

7. The method according to claim 6, wherein said characteristics of said enclosure is selected from the group consisting of: humidity, temperature, motion, time, light, infra-red light, $CO_2$, $O_2$, weather forecast, subjective operator setting, status of openings in enclosure and the operational status of auxiliary ventilation devices, cooling sources or heating sources.

8. The method according to claim 1, wherein the operation of said two or more ventilation units is synchronised so that at least one first ventilation unit of said two or more ventilation units actively establishes an air flow to or from said enclosure while at least one second ventilation unit of said two or more ventilation units enables an air flow to or from said enclosure in an opposite direction in relation to the direction of said air flow through said first ventilation unit.

9. The method according to claim 1, wherein the operation of a first ventilation unit and a second ventilation unit of said two or more ventilation units is synchronised to control the pressure inside said enclosure in accordance with a predefined pressure level.

10. The method according to claim 1, wherein at least one of said two or more ventilation units communicates said information regarding operational conditions wirelessly.

11. The method according to claim 1, wherein said operation control data is communicated to said two or more ventilation units as overlaying signals on a power supply wire supplying power to an air flow generator of said two or more ventilation units.

12. The method according to claim 1, wherein said air flow is measured by measuring an inside temperature at an inside of said enclosure at said ventilation units and measuring an outside temperature at an outside of said enclosure at said ventilation units.

13. A ventilation system for ventilating an enclosure, said ventilation system comprising two or more ventilation units which each selectively and repeatedly can be controlled to establish an air flow to and from the enclosure, and one or more controllers for controlling said ventilation units, wherein said controllers are adapted for
   determining information regarding operational conditions of one or more of said two or more ventilation units by at least measuring the air flow through said ventilation units or the pressure differential across said ventilation units,
   generating operation control data for one or more of the ventilation units using information regarding operational conditions determined at at least one other of said two or more ventilation units, and
   controlling the operation of one or more of said two or more ventilation units by applying said generated operation control data.

14. The ventilation system according to claim 13, wherein one or more of said two or more ventilation units comprise one or more air valves for changing the resistance of air flow through said ventilation units.

15. The ventilation system according to claim 13, wherein one or more of said two or more ventilation units comprise heat transferring means for transferring heat energy from air flowing out of the enclosure through said ventilation units to air flowing into the enclosure through said ventilation units or transferring heat energy from air flowing into the enclosure through said ventilation units to air flowing out of the enclosure through said ventilation units.

16. The ventilation system according to claim 15, wherein said heat transferring means is a regenerator.

17. The ventilation system according to claim 13, wherein at least one of said two or more ventilation units comprises at least one of a receiver for receiving operation control data from said one or more controllers and a transmitter for transmitting information regarding the operational conditions of said at least one ventilation unit to said one or more controllers.

18. The ventilation system according to claim 13, wherein said one or more controllers for generating the said operation control data are integrated in at least one of said two or more ventilation units.

\* \* \* \* \*